United States Patent [19]
Akaiwa

[11] Patent Number: 4,752,742
[45] Date of Patent: Jun. 21, 1988

[54] FREQUENCY DEMODULATOR FOR RECOVERING DIGITAL SIGNALS

[75] Inventor: Yoshihiko Akaiwa, Tokyo, Japan

[73] Assignee: NEC Corporation, Japan

[21] Appl. No.: 65,639

[22] Filed: Jun. 26, 1987

Related U.S. Application Data

[63] Continuation of Ser. No. 883,841, Jul. 9, 1986, abandoned, which is a continuation of Ser. No. 667,645, Nov. 2, 1984, abandoned.

[30] Foreign Application Priority Data

Nov. 8, 1983 [JP] Japan ................................. 58-209313

[51] Int. Cl.[4] ........................................... H04L 27/14
[52] U.S. Cl. .................................... 329/105; 329/124; 375/88; 375/94
[58] Field of Search ................ 329/50, 122, 124, 105, 329/110, 104; 455/214, 337; 375/80, 81, 82, 88, 94

[56] References Cited

U.S. PATENT DOCUMENTS

| | | | |
|---|---|---|---|
| 4,193,034 | 3/1980 | Vance | 329/104 X |
| 4,254,503 | 3/1981 | Vance | 375/91 |
| 4,322,851 | 3/1982 | Vance | 375/80 X |
| 4,521,892 | 6/1985 | Vance et al. | 329/124 X |

*Primary Examiner*—Siegfried H. Grimm
*Attorney, Agent, or Firm*—Laff, Whitesel, Conte & Saret

[57] ABSTRACT

A frequency demodulator for a frequency shift keyed (FSK) signal which is modulated by two-level digital signals. The demodulator includes a logic circuit and a quadrature detector having a local oscillator frequency which is substantially equal to the center frequency of the received signal to produce a baseband signal in a quadrature phase relationship. The two-level digital signal is recovered as an output of the logic circuits depending upon whether the received FSK signal frequency is higher or lower than the local oscillator frequency. The demodulator solves the problems centered about a need for analog circuits which are undesirable, from an integrated circuit implementation standpoint. The demodulator avoids spike noise which deteriorates the error rate performance which is commonly found in the prior art (e.g. U.S. Pat. No. 4,521,892).

4 Claims, 4 Drawing Sheets

FREQUENCY DEMODULATOR FOR RECOVERING DIGITAL SIGNALS

This is a continuation of Ser. No. 883,841, filed July 9, 1986, now abandoned which was a continuation of Ser. No. 667,645, filed Nov. 2, 1984, now abandoned.

BACKGROUND OF THE INVENTION

The present invention relates to a frequency detector for detecting a singal which has been frequency-modulated by a digital signal and, more particularly, to a frequency detector suitable for an integrated circuit.

Implementations heretofore proposed for accomplishing a frequency detector in an integrated circuit configuration includes a so-called direct conversion system. An advantage attainable with the direct conversion system is that it directly converts a received carrier wave to a baseband signal so as to allow filtering and other processings to be performed in the baseband. Signal processing in the baseband may be implemented by a well known method which relies on differentiation and multiplication. Although the differentiation and multiplication scheme advantageously demodulates even a signal which has been modulated by an analog signal, great difficulty is experienced in realizing a circuit for practicing the method due to the need for gain control and balance of the circuitry particular thereto.

Concerning prior art constructions of the kind concerned, a reference may be made to U.S. Pat. No. 4,322,851 (Vance) which shows in FIG. 4 a decoding logic circuit arrangement for an FSK (frequency shift keyed) receiver. The arrangement comprises two inverters, four NOR gates, two SR flip-flops, four D flip-flops, and two resistors. The problem with such an arrangement is that as many as 140 transistors are necessary in total in order to implement the circuit elements mentioned above, particularly all the gate elements, rendering the overall circuit bulky and, therefore, unsuitable for an integrated circuit. Meanwhile, U.K. Patent Application GB 2 106 359 A (Standard Telephones and Cables Limited) shows in FIG. 11a a demodulator construction furnished with an analog circuit section which includes a switch, resistors, a low pass filter and other elements. While the analog circuit section of the illustrated demodulator may be removed to produce a demodulated digital signal, spike noise is apt to appear in the output of the demodulator because of a delay difference between two baseband signals applied to an output, that is, an exclusive OR circuit.

SUMMARY OF THE INVENTION

It is therefore an object of the present invention to provide a frequency detector for the detection of a signal frequency-modulated by a digital signal which can be readily implemented by an integrated circuit.

It is another object of the present invention to provide a generally improved frequency detector.

A frequency detector for detecting a signal frequency-modulated by a digital signal of the present invention comprises a local oscillator device having a frequency substantially equal to a center frequency of the modulated signal, a frequency conversion device to which the modulated signal is inputted, for outputting 2N (N being a positive integer) baseband signals which are different in phase from each other, a digitizer for digitizing the 2N baseband signals to generate 2N digital signals, an Exclusive-OR gate supplied with the 2N digital signals, a signal provided by the Exclusive-OR means being assumed to be a first signal and, when the 2N digital signals are arranged in a modulo 180° order in phase, alternate ones of the signals being assumed to belong to a first signal group and the reset of the signals to a second signal group, a first pulse generator for generating a pulse every time a state of any of the signals in the first signal group is changed, a second pulse generator for generating a pulse every time a state of any of the signals in the second signal group is changed, a signal selector connected to the Exclusive-OR gate, the first pulse generator and the second pulse generator for selecting one of binary logical states if the state of the first signal is logical "1" at a time when the first pulse generator generates an ouput pulse or if the state of the first signal is logical "0" at a time when the second pulse generator generates an output pulse, and selecting the other of the logical states if the state of the first signal is logical "0" at a time when the first pulse generator generates an ouput pulse or if the state of the first signal is logical "1" at a time when the second pulse generator generates an output pulse, a signal developed from an output signal of the signal selector being provided as a detection output signal.

In accordance with the present invention, a frequency detector detects a signal which has been frequency-modulated by a digital signal. Digital logical elements are used for most of the sections which constitute a network for frequency detection and all of them operate in the baseband. Such a construction is readily attainable in an integrated circuit.

The above and other objects, features and advantages of the present invention will become apparent from the following detailed description taken with the accompanying drawings.

DESCRIPTION OF THE PREFERRED EMBODIMENTS

While the frequency detector of the present invention is susceptible of numerous physical embodiments, depending upon the environment and requirements of use, substantial numbers of the herein shown and described embodiments have been made, tested and used, and all have performed in an eminently satisfactory manner.

Figure 1:
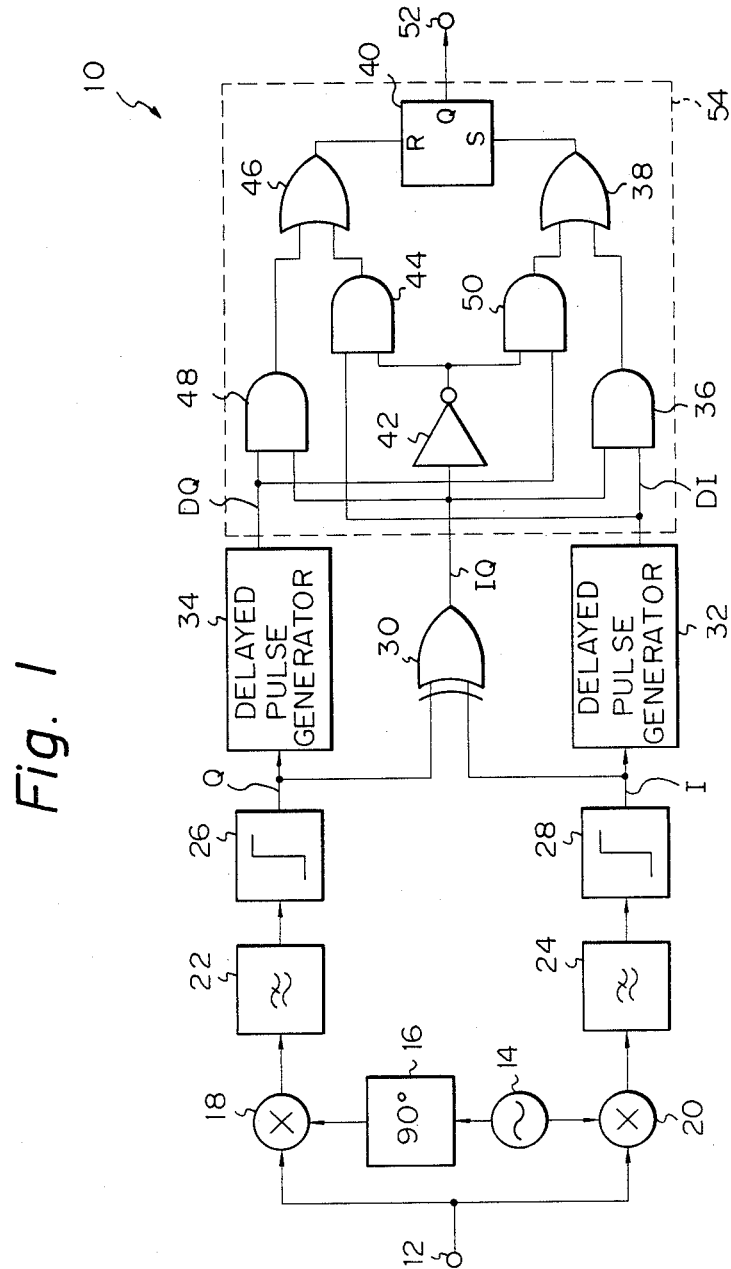
FIG. 1 is a block diagram of a frequency detector embodying the present invention.

Referring to FIG. 1 of the drawings, a frequency detector of the present invention is shown and generally designated by the reference numeral 10. A received carrier wave which has undergone frequency modulation by a mark or space digital signal is applied to an input terminal 12. A local oscillator 14 produces an output whose frequency is substantially equal to the center frequency of the input carrier wave. The oscillator output is applied on one hand to a mixer 18 via a 90° phase shifter 16 and on the other hand to another mixer 20 so that the mixers 18 and 20, using the local oscillation signals which are different in phase by 90°, frequency-convert the input carrier wave to the baseband signal. The mixer 18 is connected to a low-pass filter (LPF) 22 and the mixers 20 to a low-pass filter (LPF) 24. Each of the LPFs 22 and 24 functions to pick upon a baseband signal in a desired channel and to band-limit the noise. The baseband signals output from the low-pass filters 22 and 24 respectively are applied to digitizers 26 and 28 which then produce digital signals Q and I. Since the phase difference between the input modulated signal and the local oscillation signal differs by 90° from the mixer 18 to the mixer 20, the signals I and Q are also different in phase by 90° from each other. Exemplary waveforms of the signals I and Q are shown in FIG. 3, in which the solid lines shows a case wherein the modulation signal is the mark and the phantom lines a case wherein the modulation signal is the space.

Figure 3:
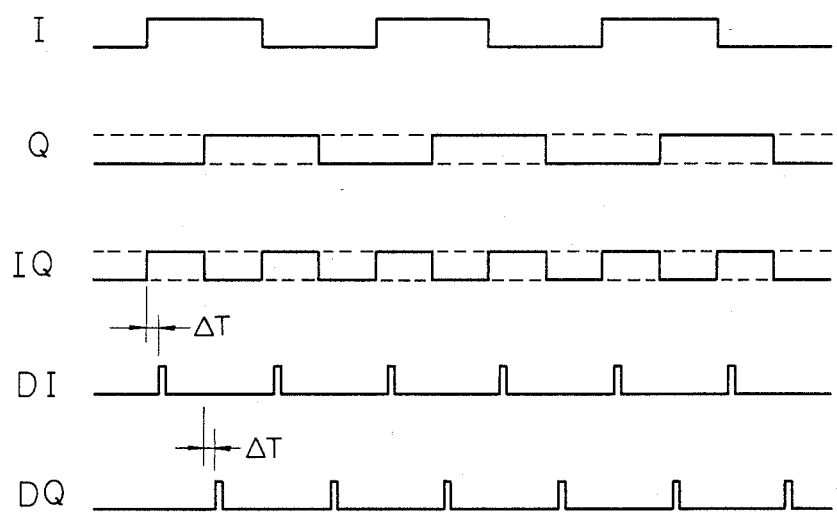
FIG. 3 shows waveforms of signals which appear in various portions of the frequency detector of FIG. 1.

The signals I and Q are routed to an Exclusive-OR (Ex-OR) gate 30 which produces a signal IQ as shown in FIG. 3. At the same time, the signals I and Q are applied to delayed pulse generators 32 and 34, respectively. The delayed pulse generators 32 and 34 generate respectively pulse signals DI and DQ each of which is delayed by a time ΔT relative to a state transition time of the associated signal I or Q. If the output signal IQ of the Ex-OR gate 30 is (logical) "1", the pulse signal DI propagates through an AND gate 36 and an OR gate 38 to a set-reset flip-flop 40 to set it and, if the signal IQ is "0" and, therefore, an output of an inverter 42 is "1", the pulse signal DI passes through an AND gate 44 and an OR gate 46 to the flip-flop 40 to reset it.

Meanwhile, the pulse signal DQ, if the signal IQ is "1", passes through an AND gate 48 and the OR gate 46 to reset the set-reset flip-flop 40 and, if the signals IQ is "0" and, therefore, the output of the inverter 42 is "1", it propagates through an AND gate 50 and the OR gate 38 to the flip-flop 40 to set it. In this construction, as will be seen from FIG. 3, the flip-flop 40 is set if the modulation signal is a mark and reset if it is a space, a detection output appearing at an output terminal 52 of the flip-flop 40. In FIG. 1, a section 54 enclosed by a phantom line constitute a logic circuit.

Figure 2:
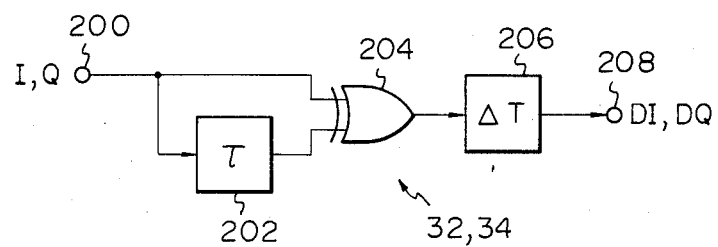
FIG. 2 is a block diagram of a delayed pulse generator circuit applicable to the frequency detector shown in FIG. 1.

The delayed pulse generators 32 and 34 may each be implemented by an arrangement shown in FIG. 2. As well known in the art, where the signal I or Q applied to an input terminal 200 is applied to an Ex-OR gate 204 directly on one hand and via a delay circuit 202 on the other hand, it is possible to generate a pulse signal at a transition point of the input signal. In the particular construction shown in FIG. 2, the pulse signal output from the Ex-OR 204 is further applied to a delay circuit 206 so that a signal DI (DQ) appears at an output terminal 208 with a delay of ΔT relative to the transition point of the signal I (Q). The purpose of the delay set up by the delay circuit 206 is to stabilize the operation by avoiding the neighborhood of the transition point of the signal IQ. Such a purpose, therefore, may also be served by inserting the delay circuit 206 in the signal IQ side. In that case, since only the sign of the detection output will be inverted, another inverter may be installed or the set and reset inputs to the flip-flop 40 may be replaced with each other.

In accordance with the embodiment described above, the phase difference between the signals I and Q is not limited to 90° and is open to choice if it is not zero. This will readily be understood by, for example, drawing such waveforms as those shown in FIG. 3. Further, the phase difference may be applied to the modulated carrier wave which is fed to the two mixers 22 and 24, instead of the output signals of the mixers 22 and 24.

Figure 4:
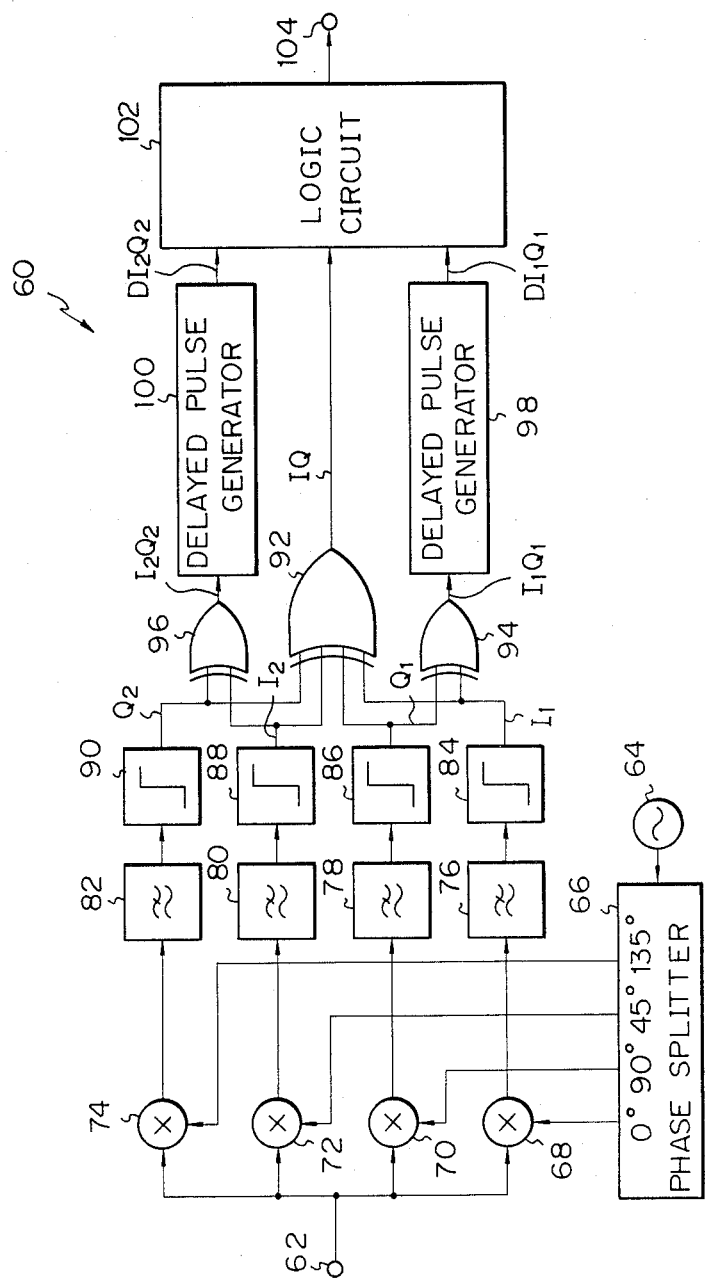
FIG. 4 is a block diagram of a frequency detector in accordance with another embodiment of the present invention.
Figure 5:
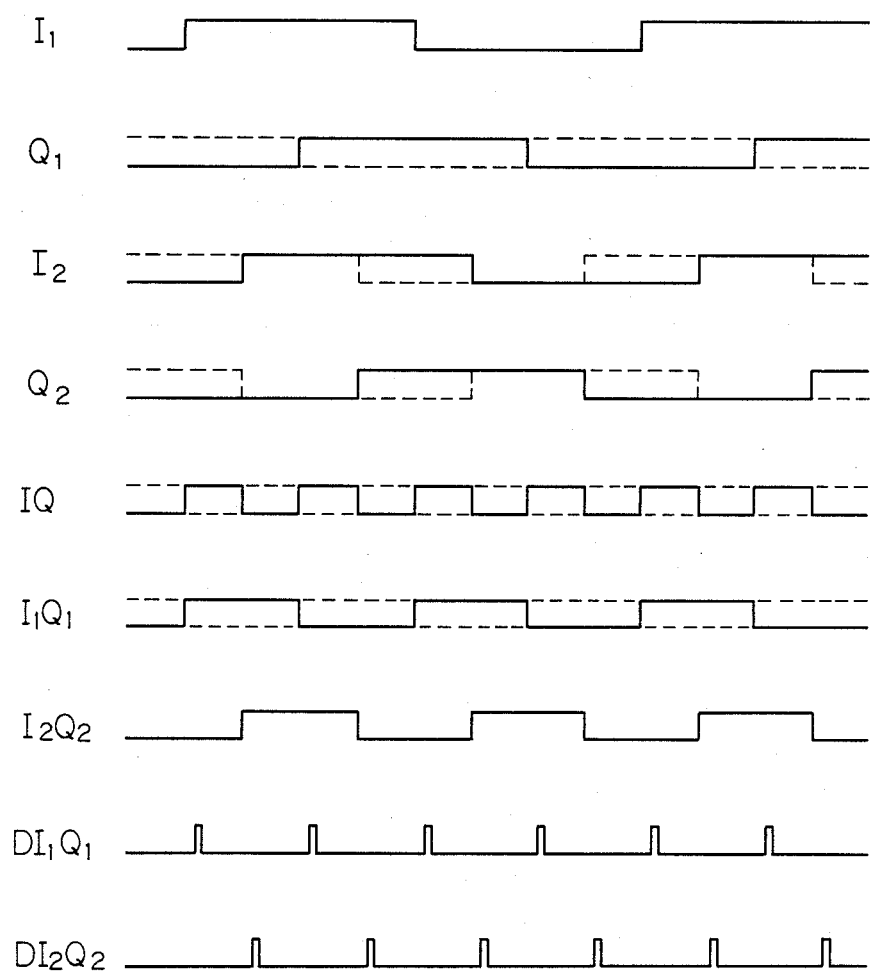
FIG. 5 shows waveforms of signals which appear in various portions of the frequency detector of FIG. 4.

Referring to FIG. 4, a frequency detector 60 in accordance with another embodiment of the present invention is shown. The operation of the frequency detector 60 will be described with reference also made to FIG. 5. The frequency modulated carrier wave is applied to an input terminal 62 of the frequency detector 60. A local oscillator 64 generates a signal whose frequency is substantially equal to the center frequency of the input modulated carrier wave. The output of the local oscillator 64 is applied to a phase splitter 66 to be thereby provided with phase differences of 0°, 45°, 90° and 135°. The four outputs of the splitter 66 respectively are fed to four mixers 68, 70, 72 and 74 as local oscillation signals, each of the mixers frequency-converting the input modulated carrier wave to the baseband signal on the basis of the associated local oscillation signal. The outputs of the mixers 68, 70, 72 and 74 respectively are passed through low pass filters 76, 78, 80 and 82 and, then, through digitizers 84, 86, 88 and 90. Let the outputs of the digitizers 84, 86, 88 and 90 be $I_1$, $Q_1$, $I_2$ and $Q_2$ respectively. These signals are different in phase from each other as shown in FIG. 5 by way of example. In FIG. 5, solid lines are associatted with the mark and phantom lines with the space.

The signals $I_1$, $Q_1$, $I_2$ and $Q_2$ are commonly applied to an Ex-OR gate 92 the output IQ of which is shown in FIG. 5. The signals $I_1$ and $Q_1$ are also applied to an Ex-OR gate 94 and the signals $I_2$ and $Q_2$ to an Ex-OR gate 96 with the result that signals $I_1Q_1$ and $I_2Q_2$ are provided. The signals $I_1Q_1$ and $I_2Q_2$ respectively are applied to delay pulse generators 98 and 100 which then produce pulse signals $DI_1Q_1$ and $DI_2Q_2$ respectively. The pulse signals $DI_1Q_1$ and $DI_2Q_2$ are delivered to a logic circuit 102 together with the signal IQ, so that a detection output appears at an output terminal 104. In FIG. 4, the logic circuit 102 is identical with the logic circuit 54 of FIG. 1. In FIGS. 4 and 5, regarding the signal $DI_1Q_1$ as a signal DI and the signal $DI_2Q_2$ as a signal DQ, it will be seen that the relationship between the signals DI and DQ and the signal IQ is the same as in the first embodiment and, hence, a detection output is produced at the output terminal 104.

While the second embodiment shown in FIGS. 4 and 5 is somewhat intricate in construction compared to the first embodiment, it is advantageously applicable to a modulated carrier wave whose phase transition rate per data repetition period is low, i.e., a modulated carrier wave with a smaller modulation index.

The detection described above is achievable even if the number of the baseband signals is increased to 2N, as will be understood by analogy from the operation of the second embodiment. Also, it will be easily confirmed that such an operation is accomplished even with unequal differences between the phases of the baseband signals. Considering the fact that the logical "1" and "0" of the signal IQ alternate with each other every time one of the numerous baseband signals changes its state, what is required for adequate operation is, assuming baseband signals arranged in order of phase, to identify a state of the signal IQ every time the state of one of alternate signals selected out of all the arranged signals is changed. Care should be taken in so arranging the phases of the signals so that those signals with phases larger than 180° are arranged after subtracting 180° from their actual phases, i.e., in a modulo 180° order.

This will readily be understood by drawing signal waveforms.

In summary, it will be seen that the present invention provides a frequency detector which can be implemented by an integrated circuit because all the circuit elements after mixers operate in a baseband and because the section after digitizers is implemented by a digital circuit. In addition, the circuitry succeeding the baseband circuit may be realized by once digitizing the signals and, then, performing the signal processing in accordance with the present invention by use of a microprocessor.

Various modifications will become possible for those skilled in the art after receiving the teachings of the present disclosure without departing from the scope thereof.

What is claimed is:

1. A frequency demodulator for demodulating a frequency modulated signal which is modulated by a two-level digital signal, said demodulator comprising:
   a quadrature detector to which the frequency modulated signal is applied and from which a pair of baseband signals are produced in a quadrature phase relationship;
   digitizer means for digitizing the baseband signals to generate two digital signals I and Q;
   Exclusive-OR means responsive to the two signals I and Q for producing a signal IQ;
   first pulse generator means for generating a first pulse responsive to a change in state of the digital signal I;
   second pulse generator means for generating a second pulse responsive to a change in state of the digital signal Q;
   signal delay means provided in two paths carrying the first and second pulses, respectively, for delaying the first and second pulses, respectively, to produce delayed pulses DI and DQ;
   signal selector means supplied with the signal IQ, the delayed pulse DI and the delayed pulse DQ for selecting one of two binary logical states if the state of the output signal of the Exclusive-OR means is a logical "1" at a time when a delayed pulse DI occurs or if the state of the output signal of the Exclusive-OR means is logical "0" at a time when a delayed pulse DQ occurs, and for selecting the other of the two logical states if the state of the output signal of the Exclusive-OR means is logical "0" at a time when a delayed pulse DI occurs or if the state of the output signal of the Exclusive-OR means is logical "1" at a time when a delayed pulse DQ occurs; and
   means for giving an output signal from the signal selector means as a demodulated output signal.

2. A frequency demodulator as claimed in claim 1, wherein the quadrature detector comprises a local oscillator having a frequency which is substantially equal to a center frequency of the frequency modulated signal, a phase splitting network responsive to an output signal of said local oscillator to produce two local oscillating signals which are in a quadrature phase relationship, a first and a second mixer responsive to the frequency modulated signal and tone of the two local oscillating signals, respectively, and a first and a second low-pass filter responsive to output signals of said first and second mixers respectively to produce a pair of baseband signals which are in a quadrature phase relationship.

3. A frequency demodulator for demodulating a frequency modulated signal which is modulated by a two-level digital signal, said demodulator comprising:
   a first and a second quadrature detector to which the frequency modulated signal is applied and from which two pairs of baseband signals are taken in a relative phase relationship of 0° and 90° and 45° and 135°;
   digitizer means for digitizing the baseband dsignals to generate four digital signals $I_1$, $Q_1$, $I_2$ and $Q_2$ which are in a relative phase relationship of 0° and 90° and 45° and 135°, respectively;
   Exclusive-OR means supplied with the four digital signals $I_1$, $Q_1$, $I_2$ and $Q_2$ for producing a signal IQ;
   first pulse generator means for generating a first pulse responsive to a change in states of the digital signals $I_1$ and $Q_1$;
   second pulse generator means for generating a second pulse responsive to a change in states of the digital signals $I_2$ and $Q_2$;
   signal delay means provided in two paths carrying the first and second pulses, respectively, for delaying the first and second pulses, respectively, to produce delayed pulses $DI_1Q_1$ and $DI_2Q_2$;
   signal selector means supplied with the signal IQ and the delayed pulses $DI_1Q_1$ and $DI_2Q_2$, said signal selector means selecting one of two binary logical states if the state of the output signal of the Exclusive-OR means is logical "1" at a time when a delayed pulse $DI_1Q_1$ occurs or if the state of the output signal of the Exclusive-OR means is logical "0" at a time when a delayed pulse $DI_2Q_2$ occurs, and selecting the other of the two logical states if the state of the output signal of the Exclusive-OR means is logical "0" at a time when a delayed pulse $DI_1Q_1$ occurs or if the state of the output signal of the Exclusive-OR means is logical "1" at a time when a delayed pulse $DI_2Q_2$ occurs; and
   means for giving an output signal from the signal selector means as a demodulated output signal.

4. A frequency demodulator as claimed in claim 3, wherein the first and second quadrature detectors comprise a local oscillator having a frequency which is substantially equal to a center frequency of the frequency modulated signal, a phase splitting network responsive to an output signal of said local oscillator to produce four local oscillating signals which are in a relative phase relationship of 0°, 90°, 45° and 135°, a first and a second mixer responsive to the frequency modulated signal and to one of the local oscillating signals, respectively, which are in a quadrature phase relationship of 0° and 90°, a first and a second low-pass filter responsive to output signals of said first and second mixers respectively to produce a pair of baseband signals which are in a quadrature phase relationship, a third and a fourth mixer responsive to the frequency modulated signal and to one of the local oscillating signals, respectively, which are in a quadrature phase relationship of 45° and 135°, and a third and a fourth low-pass filter responsive to output signals of said third and fourth mixers respectively to produce a pair of baseband signals which are in a quadrature phase relationship.

* * * * *